United States Patent [19]

Chuang

[11] Patent Number: 5,405,290

[45] Date of Patent: Apr. 11, 1995

[54] APPARATUS FOR SEPARATING THE BONES FROM PARTS OF PIGS' LEGS

[76] Inventor: Jui-Yen Chuang, No. 53, Lane 53, Tzu-Chiang 3rd. Rd., Kaohsiung City, Taiwan, Prov. of China

[21] Appl. No.: 280,512

[22] Filed: Jul. 26, 1994

[51] Int. Cl.⁶ .............................................. A22C 17/04
[52] U.S. Cl. ..................................... 452/136; 452/125
[58] Field of Search ............... 452/136, 135, 138, 125, 452/127

[56] References Cited

U.S. PATENT DOCUMENTS

| | | | |
|---|---|---|---|
| 2,857,619 | 10/1958 | Massengill | 452/136 |
| 2,893,051 | 7/1959 | Massengill | 452/136 |
| 3,522,738 | 8/1970 | Zwiep et al. | 452/136 |
| 3,629,903 | 12/1971 | Turner | 452/137 |
| 4,380,849 | 4/1983 | Adkison et al. | 452/136 |
| 4,488,332 | 12/1984 | Atteck et al. | 452/136 |
| 4,811,456 | 3/1989 | Heuvel | 452/136 |
| 5,267,891 | 12/1993 | Cresson et al. | 452/136 |
| 5,297,984 | 3/1994 | Gagliardi, Jr. | 452/136 |

Primary Examiner—Willis Little
Attorney, Agent, or Firm—Varndell Legal Group

[57] ABSTRACT

An apparatus for separating the bones from parts of pigs' legs, including a machine base having a horizontal track, a sliding board moved in the track and having a center hole for inserting the bone of the part of the pig's leg to be processed, a first hydraulic cylinder, a first pull rope driven by the first hydraulic cylinder to pull the bone of the part of the pig's skin upwards, a second hydraulic cylinder, and a second pull rope driven by the second hydraulic cylinder to pull the skin of the part of the pig's leg downwards.

6 Claims, 5 Drawing Sheets

APPARATUS FOR SEPARATING THE BONES FROM PARTS OF PIGS' LEGS

BACKGROUND OF THE INVENTION

The present invention relates to an apparatus specifically designed for separating the bones from parts of pigs' legs.

Removing the bone of the part of a pig's leg near the knuckle is not an easy job. Knifes and/or scissors are commonly used to remove the the bone from the skin. When the bone is removed, the skin is stuffed with prepared meat and then stitched up for sale. This processing process is complicated and time-consuming.

SUMMARY OF THE INVENTION

The present invention has been accomplished under the circumstances in view. It is therefore the major object of the present invention to provide an apparatus which separates the bones from parts of pigs' legs efficiently. According to the present invention, the apparatus is comprised of a machine base having a horizontal track, a sliding board moved in the track and having a center hole for inserting the bone of the part of the pig's leg to be processed, a first hydraulic cylinder, a first pull rope driven by the first hydraulic cylinder to pull the bone of the part of the pig's skin upwards, a second hydraulic cylinder, and a second pull rope driven by the second hydraulic cylinder to pull the skin of the part of the pig's leg downwards As an alternate form of the present invention, motor drives or pneumatic cylinders may be used instead of the hydraulic cylinders, and steel chains may be used instead of the pull ropes.

DETAILED DESCRIPTION OF THE PREFERRED EMBODIMENT

Figure 1:
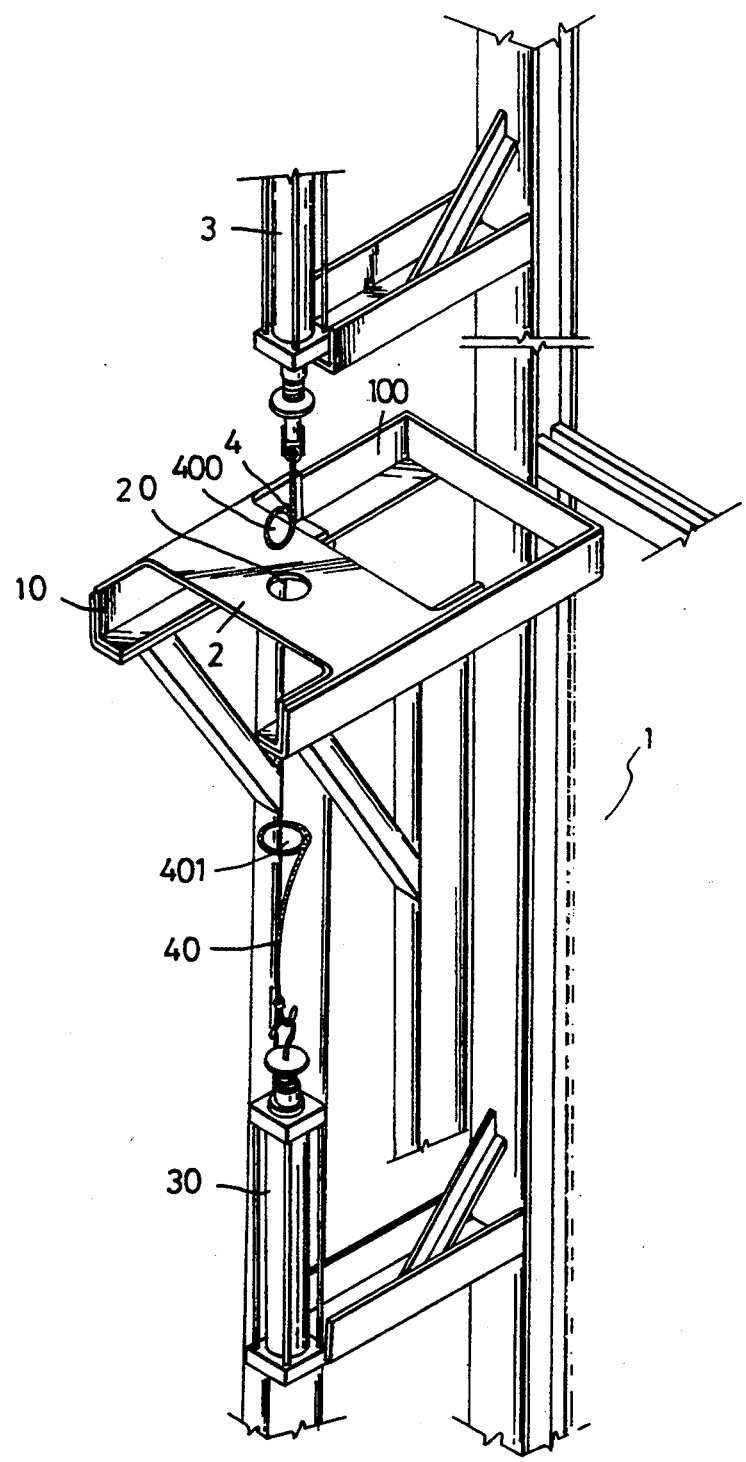
FIG. 1 is an elevational view of the apparatus of the present invention.
Figure 2:
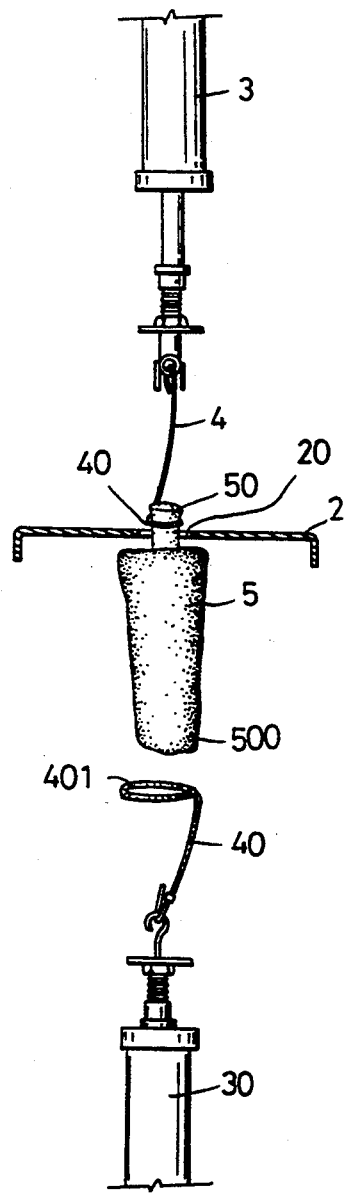
FIG. 2 shows the present invention operated (step I)
Figure 3:
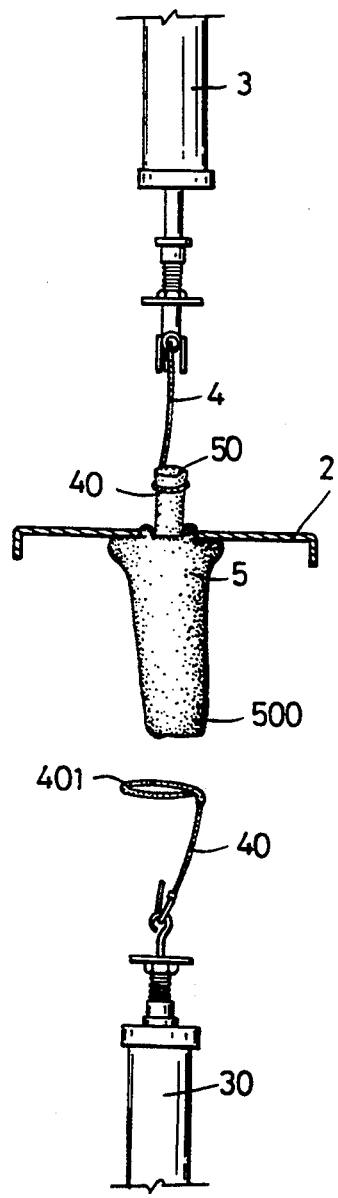
FIG. 3 shows the present invention operated (step II)
Figure 4:
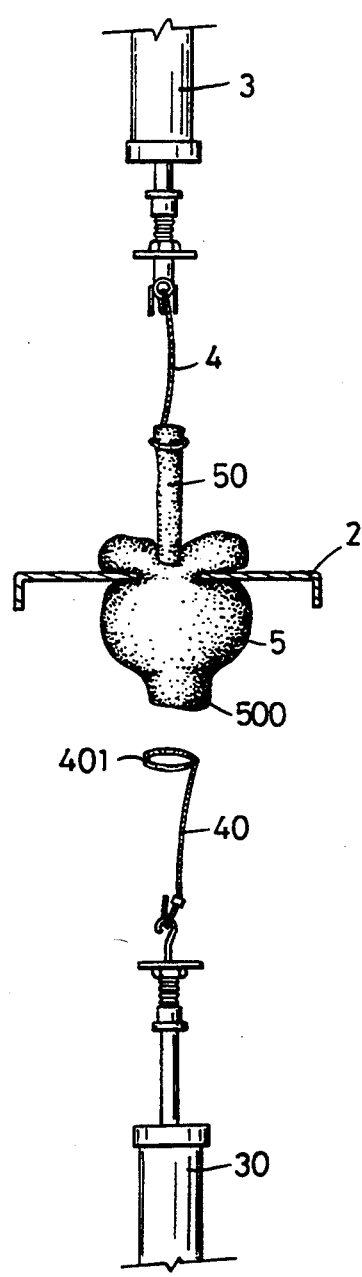
FIG. 4 shows the present invention operated (step III)
Figure 5:
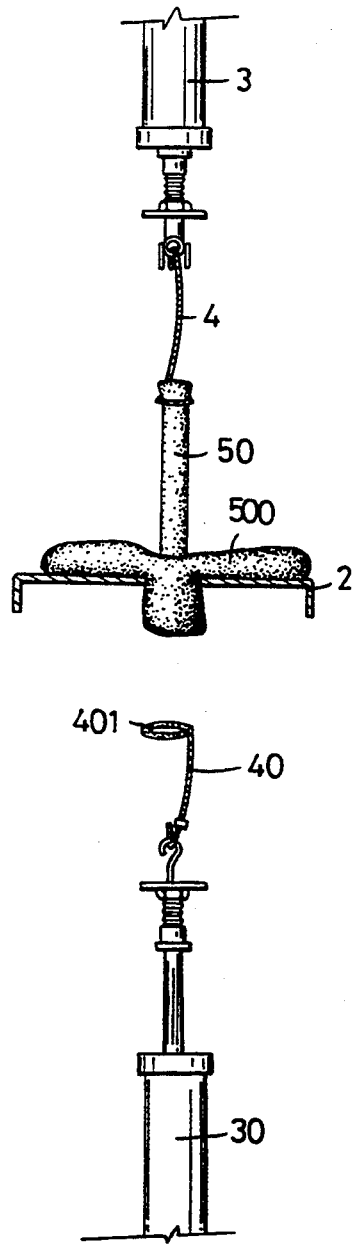
FIG. 5 shows the present invention operated (step IV)
Figure 6:
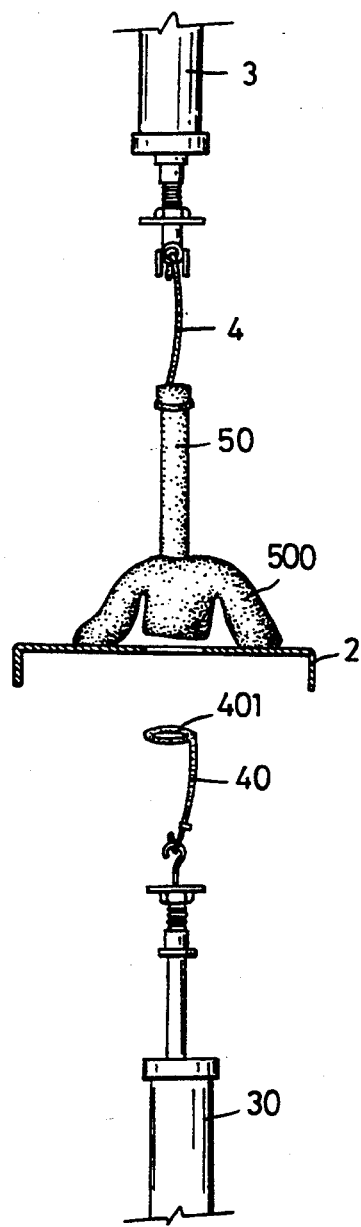
FIG. 6 shows the present invention operated (step V)
Figure 7:
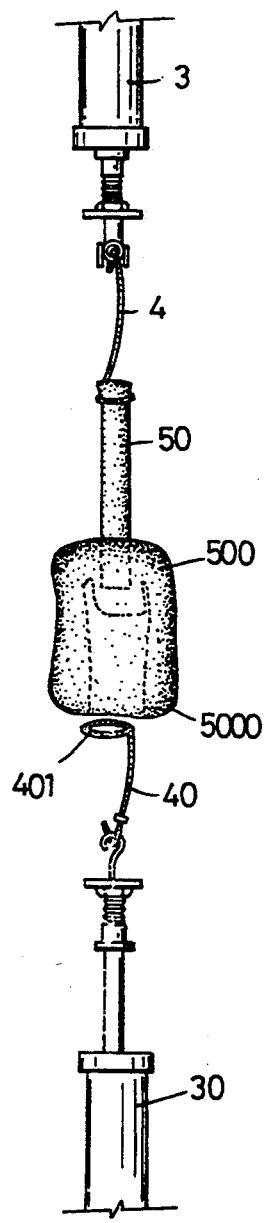
FIG. 7 shows the present invention operated (step VI)
Figure 8:
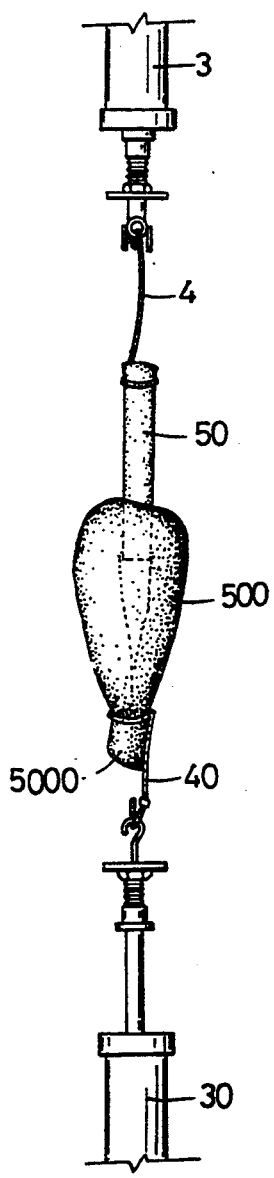
FIG. 8 shows the present invention operated (step VII)
Figure 9:
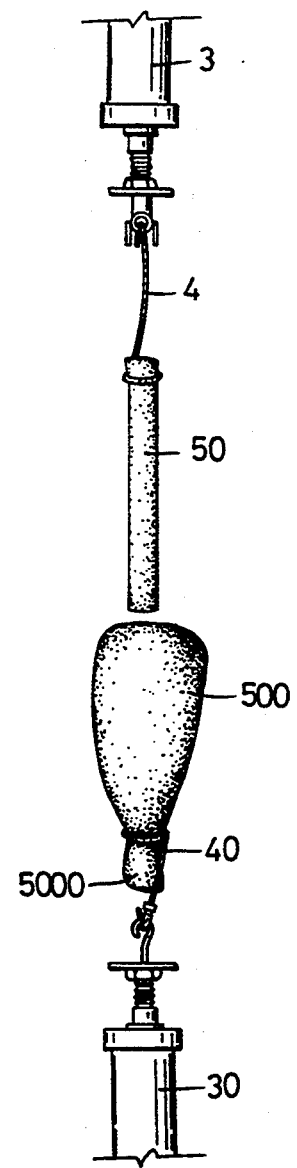
FIG. 9 shows the present invention operated (step VIII).

Referring to FIG. 1, the apparatus of the present invention is generally comprised of a machine base 1, a sliding board board 2, a first hydraulic cylinder 3, a second hydraulic cylinder 30, a first pull pull rope 4, and a second pull rope 40. The machine base 1 comprises a horizontal support 10 defining a sliding track 100. The sliding board 2 slides in the sliding track 100 of the horizontal support 10 of the machine base 1, having a center hole 20 for passing the bone 50 of the part 5 of the pig's leg to be processed (see FIG. 2). The first hydraulic cylinder 3 is downwards mounted on the machine base 1 at the top. The second hydraulic cylinder 30 is upwards mounted on the machine base 1 at the bottom and vertically aligned with the first hydraulic cylinder 3. The first pull rope 4 has one end coupled to the first hydraulic cylinder 3 and an opposite end terminating in a loop 400. The second pull rope 40 has one end coupled to the second hydraulic cylinder 30 and an opposite end terminating in a loop 401.

The operation of the present invention is outlined hereinafter with reference to FIGS. 2 through 9. The bone 50 of the part 5 of the pig's leg is inserted into the center hole 20 of the sliding board 2 and then fastened to the loop 40 of the first pull rope. 4 (see FIG. 2), then the first hydraulic cylinder 3 is operated to pull up the first pull rope 4 causing the skin 500 of the part 5 gradually detached from the bone 50 (see FIGS. 3, 4, and 5) and simultaneously squeezed upwards out of the center hole 20. When the bone 50 has been lifted from the sliding board 2 (see FIG. 6), the sliding board 2 is moved away (backwards along the sliding track 100; see FIG. 7), then the loop 401 of the second pull rope 40 is fastened to the suspending end 5000 of the skin 500 of the part 5 (see FIG. 8), and then the first and second hydraulic cylinders 3 and 30 are operated to pull the first and second pull ropes 4 and 40 in the reversed directions, causing the skin 500 and the bone 50 separated from each other (See FIG. 9).

I claim:

1. An apparatus for separating the bones from parts of pigs' legs, comprising:
    a machine base having a horizontal sliding track;
    a sliding board moved in said horizontal sliding track, said sliding board having a center hole for inserting the bone of the part of the pig's leg to be processed;
    a first driving mechanism mounted on said machine base at the top;
    a first hanging means coupled to said first driving mechanism for fastening to the bone of the part of the pig's leg to be processed permitting the bone to be pulled upwards out of the center hole on said sliding board;
    a second driving mechanism mounted on said machine base at the bottom; and
    a second hanging means coupled to said second driving mechanism for fastening to the skin of the part of the pig's leg permitting the skin to be pulled downwards as the bone is pulled upwards by said first driving mechanism and said first handing means.

2. The apparatus of claim 1 wherein said first and second driving mechanisms are hydraulic cylinders.

3. The apparatus of claim 1 wherein said first and second driving mechanisms are motor drives.

4. The apparatus of claim 1 wherein said first and second driving mechanism are pneumatic cylinders.

5. The apparatus of claim 1 wherein said first and second hanging means are ropes.

6. The apparatus of claim 1 wherein said first and second hanging means steel chains.

* * * * *